United States Patent
Law et al.

(10) Patent No.: US 9,433,960 B2
(45) Date of Patent: Sep. 6, 2016

(54) LIQUID DOSING DEVICES

(71) Applicant: Rieke Corporation, Auburn, IN (US)

(72) Inventors: Brian Robert Law, Leicester (GB); Jeffrey William Spencer, Leicester (GB); David John Pritchett, Ashby de la Zouch (GB)

(73) Assignee: Rieke Corporation, Auburn, IN (US)

( * ) Notice: Subject to any disclaimer, the term of this patent is extended or adjusted under 35 U.S.C. 154(b) by 55 days.

(21) Appl. No.: 14/021,242

(22) Filed: Sep. 9, 2013

(65) Prior Publication Data

US 2014/0008398 A1    Jan. 9, 2014

Related U.S. Application Data

(63) Continuation-in-part of application No. 13/036,252, filed on Feb. 28, 2011, now Pat. No. 8,528,795, which is a continuation of application No. PCT/GB2009/002106, filed on Sep. 1, 2009.

(30) Foreign Application Priority Data

Sep. 1, 2008    (GB) .................................. 0815881.8

(51) Int. Cl.
  *B65D 47/00*    (2006.01)
  *B05B 11/04*    (2006.01)
  (Continued)

(52) U.S. Cl.
  CPC .............. *B05B 11/048* (2013.01); *B05B 11/04* (2013.01); *B65D 47/0838* (2013.01); *B65D 47/2018* (2013.01); *G01F 11/082* (2013.01); *G01F 11/263* (2013.01)

(58) Field of Classification Search
  CPC .. B05B 11/048; B05B 11/04; B65D 47/0838
  USPC .......... 222/477, 494, 490–491, 212–215, 21, 222/71; 251/85, 170; 270/349, 376, 905, 270/910
  See application file for complete search history.

(56) References Cited

U.S. PATENT DOCUMENTS 2,581,897 A  *  1/1952  Allen ............................... 222/81
2,774,517 A     12/1956  Teegardin et al.
(Continued)

FOREIGN PATENT DOCUMENTS

DE    39 29 264 A    1/1991
EP    0 098 939 A2   1/1984
(Continued)

OTHER PUBLICATIONS

European Patent Application 04255318 Search Report mailed Jun. 14, 2006.
(Continued)

*Primary Examiner* — Kevin P Shaver
*Assistant Examiner* — Michael J Melaragno
(74) *Attorney, Agent, or Firm* — Woodard Emhardt Moriarty McNett & Henry LLP

(57) ABSTRACT

A dosing device for dispensing liquid from a container (1) in which flow through flow openings (23) to an outlet tube (44) is blocked after controlled delay by an obturator (3) moveable within a control chamber (2) mounted in a container neck (101) behind the outlet tube (44). Movement of the obturator (3) is governed by restricted flow through control openings (28) at the rear of the control chamber. Restoration of the obturator to the back of the control chamber facilitates repeated dosing. An elastomeric element (6) of resiliently deformable material promotes a seal to achieve a cleanly defined dose. In one proposal the elastomeric element coats the surface of the obturator and/or the outlet tube (64) to cut off the flow. Another proposal provides a one-way elastomeric valve element (63) for blocking the flow openings to enable rapid recovery after a dosing operation.

23 Claims, 8 Drawing Sheets

(51) Int. Cl.
  *G01F 11/26* (2006.01)
  *G01F 11/08* (2006.01)
  *B65D 47/08* (2006.01)
  *B65D 47/20* (2006.01)

(56) References Cited

U.S. PATENT DOCUMENTS

| | | | |
|---|---|---|---|
| 2,919,056 A | 12/1959 | Collins | |
| 3,134,514 A * | 5/1964 | Booth | 222/207 |
| 3,379,136 A | 4/1968 | Corsette | |
| 4,118,152 A | 10/1978 | Bron | |
| 4,179,051 A * | 12/1979 | Thomas | 222/494 |
| 4,277,001 A | 7/1981 | Nozawa | |
| 4,286,736 A | 9/1981 | Corsette et al. | |
| 4,360,130 A | 11/1982 | Nishimura et al. | |
| 4,364,718 A | 12/1982 | Beun et al. | |
| 4,371,098 A | 2/1983 | Nozawa et al. | |
| 4,474,314 A * | 10/1984 | Roggenburg, Jr. | 222/494 |
| 4,519,530 A * | 5/1985 | Schmidt | 222/494 |
| 4,589,573 A | 5/1986 | Tada | |
| 4,673,109 A | 6/1987 | Cassia | |
| 4,728,011 A * | 3/1988 | Schuster et al. | 222/439 |
| 4,775,079 A | 10/1988 | Grothoff | |
| 4,776,498 A | 10/1988 | Maerte et al. | |
| 4,811,871 A | 3/1989 | Wass et al. | |
| 4,958,752 A | 9/1990 | Maerte et al. | |
| 5,000,353 A * | 3/1991 | Kostanecki et al. | 222/207 |
| 5,016,780 A | 5/1991 | Moretti | |
| 5,115,980 A | 5/1992 | Skorka | |
| 5,129,561 A * | 7/1992 | Drobish | 222/455 |
| 5,165,577 A | 11/1992 | Ophardt | |
| 5,282,552 A | 2/1994 | Ophardt | |
| 5,346,105 A * | 9/1994 | Onneweer | 222/455 |
| 5,353,969 A | 10/1994 | Balderrama | |
| 5,373,970 A | 12/1994 | Ophardt | |
| 5,401,148 A | 3/1995 | Foster et al. | |
| 5,431,309 A | 7/1995 | Ophardt | |
| 5,445,288 A | 8/1995 | Banks | |
| 5,472,122 A * | 12/1995 | Appleby | 222/212 |
| 5,489,044 A | 2/1996 | Ophardt | |
| 5,548,943 A | 8/1996 | Behar et al. | |
| 5,676,277 A | 10/1997 | Ophardt | |
| 5,738,250 A | 4/1998 | Gillingham et al. | |
| 5,813,576 A | 9/1998 | Iizuka et al. | |
| 5,904,272 A | 5/1999 | Kaufman et al. | |
| 5,975,360 A | 11/1999 | Ophardt | |
| 5,988,456 A | 11/1999 | Laible | |
| 6,045,008 A | 4/2000 | Gonzalez et al. | |
| 6,082,586 A | 7/2000 | Banks | |
| 6,126,042 A | 10/2000 | Meshberg | |
| 6,240,979 B1 | 6/2001 | Lorscheidt | |
| 6,343,724 B1 | 2/2002 | Ophardt et al. | |
| 6,409,050 B1 | 6/2002 | Ophardt et al. | |
| 6,516,976 B2 | 2/2003 | Lewis et al. | |
| 6,533,145 B2 | 3/2003 | Lewis et al. | |
| 6,540,117 B2 | 4/2003 | Powling | |
| 6,540,157 B2 | 4/2003 | Ophardt | |
| 6,543,651 B2 | 4/2003 | Lewis et al. | |
| 6,557,736 B1 | 5/2003 | Ophardt | |
| 6,575,334 B2 | 6/2003 | Lewis et al. | |
| 6,575,335 B2 | 6/2003 | Lewis et al. | |
| 6,601,736 B2 | 8/2003 | Ophardt et al. | |
| 6,662,977 B2 * | 12/2003 | Gerber et al. | 222/494 |
| 7,004,356 B1 | 2/2006 | Sayers | |
| 7,011,237 B1 | 3/2006 | Sayers et al. | |
| 7,104,426 B2 | 9/2006 | Suzuki | |
| 7,325,704 B2 | 2/2008 | Kasting | |
| 7,367,476 B2 | 5/2008 | Law et al. | |
| 7,461,762 B2 | 12/2008 | Law et al. | |
| 7,654,418 B2 | 2/2010 | Law et al. | |
| 7,690,535 B2 | 4/2010 | Law et al. | |
| 7,891,522 B2 | 2/2011 | Law et al. | |
| 8,528,795 B2 * | 9/2013 | Law et al. | 222/477 |
| 2002/0027144 A1 | 3/2002 | Lacout | |
| 2003/0132252 A1 | 7/2003 | Rossignol | |
| 2003/0201286 A1 | 10/2003 | Ophardt | |
| 2004/0112920 A1 * | 6/2004 | Felten et al. | 222/212 |
| 2004/0144809 A1 * | 7/2004 | Kerman et al. | 222/494 |
| 2004/0217137 A1 | 11/2004 | Ophardt | |
| 2005/0051579 A1 | 3/2005 | Kasting | |
| 2006/0043117 A1 | 3/2006 | Law et al. | |
| 2007/0215643 A1 | 9/2007 | Law et al. | |
| 2008/0197149 A1 | 8/2008 | Law et al. | |
| 2008/0308183 A1 | 12/2008 | Law | |
| 2009/0159618 A1 * | 6/2009 | Laible | 222/442 |
| 2009/0212074 A1 | 8/2009 | Brouwer | |
| 2010/0276515 A1 | 11/2010 | Milanese | |
| 2012/0097714 A1 | 4/2012 | Hoefte et al. | |
| 2012/0305607 A1 * | 12/2012 | Geiger et al. | 222/544 |
| 2013/0119092 A1 * | 5/2013 | Kuwagaki et al. | 222/494 |

FOREIGN PATENT DOCUMENTS

| | | |
|---|---|---|
| EP | 0 274 256 A1 | 7/1988 |
| EP | 0 389 688 A2 | 10/1990 |
| EP | 0 600 286 A2 | 6/1994 |
| EP | 0 703 831 B1 | 12/1998 |
| EP | 1 092 447 A2 | 4/2001 |
| EP | 1 190 775 A1 | 3/2002 |
| EP | 1 015 341 B1 | 1/2004 |
| EP | 1 449 595 A1 | 8/2004 |
| EP | 1 514 607 A2 | 3/2005 |
| EP | 1 629 900 A2 | 3/2006 |
| EP | 1 671 705 A1 | 6/2006 |
| EP | 1 676 640 A1 | 7/2006 |
| EP | 2 095 882 A1 | 9/2009 |
| EP | 2 133 153 A1 | 12/2009 |
| EP | 2 153 908 A1 | 2/2010 |
| GB | 1149805 | 4/1969 |
| GB | 2360273 A | 9/2001 |
| JP | H08-011921 A | 1/1996 |
| WO | WO 99/49769 A1 | 10/1999 |
| WO | WO 03/101620 A1 | 12/2003 |
| WO | WO 2005/049477 A2 | 6/2005 |
| WO | WO 2010/023462 A1 | 4/2010 |

OTHER PUBLICATIONS

European Patent Application 05256914.2 Extended Search Report mailed Mar. 2, 2006.
European Search Report in corresponding EP 11250032.7 dated May 20, 2011.
Hygiene-Technik Inc., A member of the Ophardt Group of Companies, UX10 Lotion or Foam Soap Dispenser, 2004, pp. 2.
PCT/GB2011/001001 Search Report and Written Opinion dated Nov. 24, 2011.
PCT/GB2011/001002 Search Report and Written Opinion dated Sep. 26, 2011.
Pictures of Umbrella Valve from RD Industries of Omaha, Nebraska (Pictures 1-6), Jan. 4, 2005.
United Kingdom Patent Application 1100129.4 Search Report mailed Mar. 23, 2011.

* cited by examiner

LIQUID DOSING DEVICES

CROSS REFERENCES TO RELATED APPLICATIONS

This application is a continuation-in-part of U.S. patent application Ser. No. 13/036,252 filed Feb. 28, 2011, which is a continuation of International Application PCT/GB2009/002106, filed Sep. 1, 2009, which claims the benefit of Great Britain Application No. 0815881.8, filed Sep. 1, 2008, the entire disclosures of which are hereby incorporated by reference.

BACKGROUND OF THE INVENTION

This invention has to do with devices adapted for dispensing metered doses of liquid from a container, and containers incorporating such devices, and methods of using them. In preferred embodiments the devices are used in, or adapted for use in, squeezable containers, especially resiliently-shape-recovering squeezable containers. A preferred field of use is that of containers for domestic or household use, containing detergents or other cleaning preparations, fabric conditioners, or liquid foods such as sauces.

Particularly, the invention is concerned with liquid dosing devices of a known kind (referred to below as "the kind described") having an outlet passage leading to a front discharge opening, past or around a control chamber positioned behind the front discharge opening and having one or more rear control openings to admit a restricted flow of liquid from the container interior into the control chamber. An obturator such as a sliding piston is movable in the control chamber and adapted to advance, during dispensing, under the influence of liquid flowing into the control chamber behind it through the control opening(s). When the obturator has advanced sufficiently it blocks the outlet passage to terminate the dose. Usually the outlet path of the liquid leads from the container interior forwardly past outside the control chamber and then radially inwardly, around (or through) the front peripheral part of the control chamber wall, to in front of the obturator and to the discharge opening. This front part of the chamber wall may have one or more circumferentially-distributed flow openings for this purpose. The discharge opening is typically axial or central at the front of the device. The part of the passage leading immediately to it is desirably defined by a tubular extension, projecting rearwardly towards the obturator and providing a seat against which the front of the obturator rests to block the passage.

See for example EP-A-0274256 describing how the outside of the tubular extension can also serve to guide the liquid flow rearwardly towards the obturator piston to control its rate of advance.

Devices of the kind described have an advantage, compared with dispensers using a metering chamber adjacent the container mouth, in that the volume dispensed is not swept out or held in the dosing device itself. It is possible to achieve a large dose without a large device.

However there are issues with speed and convenience. Obturators may be slow to recover position, and the dispenser needs to be returned to an upright position to create a new dose or restart the mechanism.

WO2005/049477 which was published Jun. 2, 2005, has two proposals addressing such issues. This published PCT application is hereby incorporated by reference into this disclosure.

One proposal provides a dump valve arrangement at the back of the control chamber. Such a dump valve—also discussed in one version in EP-A-0274256—is operable to close during dispensing—under gravity and/or forward fluid pressure—so that liquid enters the control chamber only through the control opening(s). The dump valve opens after dispensing—under gravity and/or reverse fluid pressure—so that liquid can escape from the control chamber more rapidly than if the only escape route were through the control opening(s).

The second proposal of WO2005/049477, implemented with a resiliently squeezable container, provides a unidirectional valve inhibiting reverse flow in the outlet passage upstream of the obturator's blocking position. On recovery of shape of the container after squeezing out a dose, the movable element of the valve—disclosed as a free annulus or a radial flap—is urged onto its seat by the reverse fluid pressure and prevents liquid from returning to the container interior by way of the outlet passage. Instead it flows back into the container from the control chamber space behind the obturator i.e. through the control opening(s), and/or dump valve opening if present. This speeds return of the obturator to its retracted position so that another dose can be dispensed, and desirably can clear the control chamber and re-initiate the obturator even while the container is inverted (typically, with the front of the dosing device and the discharge opening facing down). Repeated doses can then be dispensed without needing to right the container between doses. The forced retraction of the obturator also draws liquid back out of the discharge opening area (nozzle tube), reducing dripping after dispensing.

We have found that these previous proposals still leave something to be desired in dispensing performance in respect of clean termination of the dose, and in respect of repeated dosing while inverted. The present proposals address these issues independently and in combination, as well as (in preferred embodiments) providing convenient manufacturing solutions for the components concerned.

A first aspect of the present proposals relates to the blocking of flow by the obturator. In a device of the kind described, a surface of the device defining a part of the outlet passage in front of the obturator presents a rearwardly-directed seat, surrounding the outlet passage and engageable by a blocking portion at the front of the obturator in its advanced position, around an annular engagement region, so as to block the outlet passage as mentioned previously. The proposal is that one or both of the surfaces of the obturator and seat comprises a resiliently deformable sealing material, preferably elastomer material, at least around the respective annular engagement region thereof.

By this means we find that we can achieve a marked improvement in dosing performance, so that at the end of a dose, the flow through the discharge opening is cut off suddenly and completely with little or no subsequent dripping.

The seat against which the obturator seals is preferably the annular periphery of a rearwardly-extending tubular formation, typically a cylindrical formation. The corresponding blocking portion of the obturator may be a substantially flat surface, e.g. a substantially flat piston front face. This minimises the contact area and maximises the perpendicularity of the contact surface to the contact movement, reducing wedging and sticking. Desirably the obturator and tubular outlet formation are of relatively rigid plastics material, a the resiliently deformable (elastomeric) material for the seal being provided as a surface covering on one or both of these. We particularly prefer an elastomeric element forming an annulus around the rear edge of a tubular outlet formation, connected by some suitable means (or coated) onto the underlying plastics material of the tubular formation. Desirably the elastomeric element is or includes an annular part with a forwardly-directed annular recess or channel fitting onto the rearwardly-directed annular periphery of the tubular outlet formation.

The resiliently deformable component may be attached to the tubular outlet formation by any suitable means, e.g. interference fit, adhesive, interlock formation or integral moulding such as "two shot" moulding, perhaps with form interlock.

In one preferred embodiment a sleeve of elastomeric covering extends forwardly from the sealing seat, around the tubular outlet formation, to where this formation meets the radially-extending front web of a container closure in which the device is comprised, and the elastomeric member there desirably extends out radially from the sleeve across this web. This radial extension portion may optionally be trapped by engagement by other members of the device, or between the container neck and part of the device, for additional security.

A second aspect of the proposals disclosed herein relates to the feature of a unidirectional anti-reverse valve in the outlet passage, an idea disclosed as such in WO2005/049477. FIGS. 11 and 12 of WO2005/049477 show a radially-inwardly projecting annular valve flap mounted by an integral collar fitted around the front edge of the cylindrical control chamber. To provide adequate mounting stiffness the material used was polyethylene. The intended anti-reverse function was readily provided. However, it was learned that dosing was both difficult and erratic. It has now been learned that this problem was due to the disposition and material of the valve flap. It was also learned that there existed a problem of dripping or trickling before a first dose and between repeated doses when the container was inverted, so that repeated dosing while inverted was not of satisfactory quality.

In the present second aspect there is provided a unidirectional valve of this type which is resiliently biased against the corresponding seat portion(s), i.e. towards the closed condition. Desirably, this is by means of the valve comprising a member, e.g. flap member of elastomeric material, such as a rubber or thermoplastic elastomer (TPE). The elastomeric valve element is desirably shaped and dimensioned relative to the surrounding structure of the device so that it is deformed (e.g. flexed or compressed) relative to its free shape when assembled into the device, so that the sealing element e.g. flap thereof is biased or pre-loaded against its counter-surface in the assembled device.

Thus in some embodiments the dosing device comprises an anti-reverse valve to prevent reverse flow in the outlet passage, the valve being adjacent a front periphery of the control chamber and comprising a valve member resiliently biased towards a closed position against a corresponding opposed sealing region.

In these and other embodiments the dosing device may comprise an anti-reverse valve in the outlet passage adjacent a front periphery of the control chamber, the anti-reverse valve comprising a flap which is biased radially outwardly against the inside of the component defining the control chamber, as a seat for the flap.

An annular sealing element or flap of the valve may diverge radially outwards, e.g. in a conical form, in the rearward direction towards its sealing edge, and/or may engage an opposed sealing region which is on the inside of an annular counter-surface, e.g. the structure at the front periphery of the control chamber, which diverges radially outwards or is outwardly flared in the forward direction.

In these and other embodiments the dosing device may comprise an anti-reverse valve in the outlet passage adjacent a front periphery of the control chamber, the anti-reverse valve comprising an elastomeric element for resiliently urging the valve to a closed position against a corresponding opposed sealing region of the device.

The advantage of this is as follows. As in the proposal of WO2005/049477 above, it prevents reverse flow along the outlet passage when the container recovers its volume after dispensing a dose. This speeds retraction of the obturator. Additionally, however, the resilient bias of the valve's sealing element to its closed condition effectively resists pressure from the body of liquid in the container when the container is inverted, enabling cleaner and better-defined repeat dosing while inverted.

Dimensions, material and initial bias deformation of the sealing element may be selected so that it will open the outer passage only when a predetermined threshold pressure, corresponding for example to a typical static pressure head associated with a container full of the intended liquid product in the inverted container, is exceeded e.g. by a pressure corresponding to a typical vigorous manual squeeze of the inverted container. Moreover by this simple expedient the valve element takes on the additional function of preventing unwanted preliminary dripping or trickling from the container if there is a delay between inverting it and squeezing it.

As with the first aspect, therefore, the second aspect contributes to achieving a cleanly-defined dose and it is desirable to combine the two aspects of the proposals.

Moreover, since each of the two aspects is preferably embodied using an elastomeric element—a static seal element and a valve flap element respectively—a particularly preferred embodiment of our proposal combines these into a single elastomeric element. It may comprise a central annulus forming the seal on the rear edge of a tubular outlet formation and, radially spaced outwardly therefrom, an integral flap formation (e.g. a continuous annulus, or segment(s) corresponding to one or more circumferentially-localised flow openings) which spans the corresponding portion of the outlet passage.

Desirably the valve operates adjacent (at, adjacent or through) a front periphery of the control chamber and has a sealing edge engageable with a component bounding the outer passage at that point so that in its rest condition it blocks the outer passage at that position.

There may be plural flow openings, e.g. circumferentially distributed between formations which support the control chamber component. These may be controlled by respective portions or segments of the mentioned valve member, or more conveniently by a continuous annular valve flap since this need not be rotationally aligned during assembly.

In a preferred embodiment the valve flap projects generally rearwardly, and is biased radially outwardly against a corresponding opposed sealing region, e.g. on the inside of a component which defines a control chamber and also has supporting structure extending forwardly and/or radially outwardly to mount the control chamber in the container neck, with one or more flow openings at the front of this structure.

The elastomeric element may therefore conveniently comprise a front layer or web with a central rearward sleeve carrying the seal and, spaced radially outwardly from it, one or more rearwardly-projecting sealing skirts constituting the valve flap(s). Such a valve flap may be outwardly radially divergent at least in its free condition. Optionally also a further radially outwardly extending portion of the front web or layer is provided, to be trapped between components of the container closure to hold the elastomeric element securely in position.

By these means, a device otherwise corresponding substantially to the known devices can readily be adapted to significantly improve its dosing performance, reducing dripping or leakage both before and after each dose and/or enabling repeated dosing in the inverted condition if desired.

In other respects, the general conformation of the closure elements (e.g. control chamber, obturator, cap, container) may be as described in the earlier applications acknowledged previously. The device may be provided on a neck at the top of an invertible container. The discharge opening may be directed upwardly, e.g. vertically upwardly, when the container stands upright on its base. The movement direction of the obturator is desirably generally coaxial with the neck, and desirably generally coaxial with the external discharge opening.

In a preferred version, as mentioned above, the outlet passage begins with substantially the entire space surrounding the control chamber—e.g. through a clearance between this chamber (which is typically cylindrical) and a wider container neck in which it is mounted, preferably coaxially—and leads through or around the front edge of the control chamber via one or more circumferentially-distributed openings so as to provide a suitable cross-section of flow, and then inwardly to a central discharge outlet this outlet having said rearwardly-extending tube formation.

In preferred constructions the control chamber and its connection structure are a single moulded unit, connecting to a front cap component of the device which also comprises integrally (or mounts) the discharge outlet formation, and includes means such as a screw thread or snap ribs for securing it onto/into a container neck opening, with the control chamber projecting back inside the container neck with lateral or radial clearance for the outflow of product past it. Desirably an outer cover cap for the discharge opening is included. The cover cap may include a plug closure for the discharge opening. The cover cap may be integrally hinged to the mentioned front cap component. It will be understood that the main web of the front cap component may provide the rear surface against which the radial web of the preferred elastomeric component may lie.

The form of the obturator is not particularly limited, and all of the general and specific options proposed in EP-A-0 274 256 and WO 2005/049477 are available.

The squeezable container may be of any (e.g. well-known) type, shape and material.

The components of the dosing closure device are typically moulded plastics components, joining by snap, press or screw engagements without requiring discrete fasteners. The device is suitable for implementation in mass-produced containers, e.g. for household products or food products. In this respect, TPE is desirable for use as the elastomeric components because many TPEs have high compatibility with household or indeed food use.

The control chamber may or may not be provided with a dump valve of the type described in our above-mentioned earlier applications for further facilitating emptying of the chamber after dosing.

Examples of the present proposals are now described with reference to the accompanying drawings.

BRIEF SUMMARY

A dosing device for dispensing liquid from a container in which flow through flow openings to an outlet tube is blocked after controlled delay by an obturator moveable within a control chamber mounted in a container neck behind the outlet tube. Movement of the obturator is governed by restricted flow through control openings at the rear of the control chamber. Restoration of the obturator to the back of the control chamber facilitates repeated dosing. An elastomeric element of resiliently deformable material promotes a seal to achieve a cleanly defined dose. In one proposal the elastomeric element coats the surface of the obturator and/or the outlet tube to cut off the flow. Another proposal provides a one-way elastomeric valve element for blocking the flow openings to enable rapid recovery after a dosing operation.

One object of the present disclosure is to describe an improved dosing device for dispensing liquid from a container.

DETAILED DESCRIPTION

Figures 1, 2:
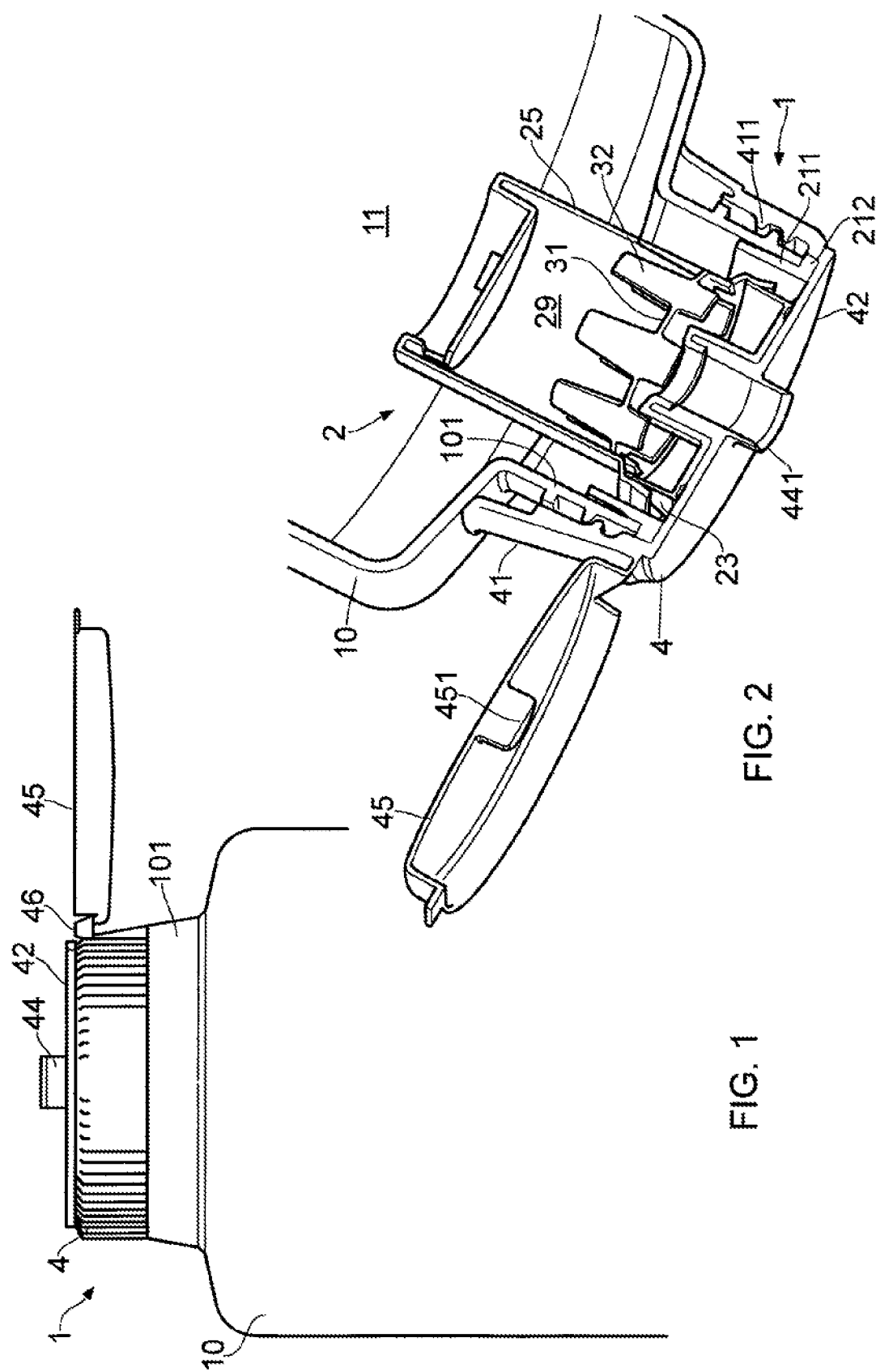
FIG. 1 is an elevation of the upper part of a squeezable container, showing the external appearance of a dosing device of the present type.
FIG. 2 is an axial section showing the dosing device in an inverted position.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

With reference to FIGS. 1 and 2, a dosing dispenser device 1 fits on the neck of a plastic squeezable container 10. The dosing device 1 has a front cap component 4, being a one-piece moulding providing a front plate 42, a central outlet tube formation 44 with a forwardly projecting nozzle 441 and an outer securing skirt 41 with an internal thread 411 by means of which it fixes onto the container neck 101.

An outer cover cap 45 is also provided, joining integrally to the rest of the cap component 4 through an integral butterfly hinge 46 so that the cap 45 is bistable in position, i.e. it tends either to be in fully shut or fully open position as shown. The underside of the cap 45 has an integral nozzle plug 451 which locks the outer nozzle 441 when the cap is shut.

The second major component of the device is a control chamber or insert cylinder component 2. This is moulded from rigid plastics and consists essentially of a closed cylindrical side wall 25 defining an internal control chamber 29, and having around its front edge a connection structure in the form of an integral forward extension 21. The connection structure 21 comprises a continuous outer annulus 211 which plugs into the container neck 101 and has an outward end flange 212 which is trapped between the edge of the container neck and the underside of the cap web 42. Inwardly of this, the front edge of the chamber wall 25 has an outwardly flared portion 213 (seen best in FIG. 3) which in some circumferential regions connects through to the base of the locating ring 211, as seen in the portions indicated in FIG. 4, described later), and at other circumferential regions stops short of the front so that a flow opening 23 is defined. Here there are three equidistant flow openings 23 but this is not critical.

Figure 4:
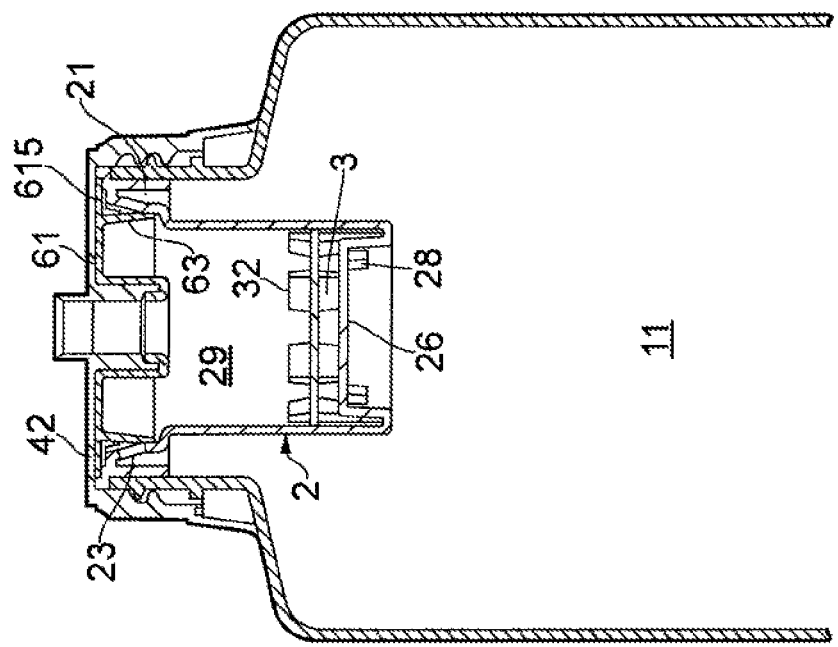
FIG. 4 is an axial section showing a variant construction of the elastomeric insert.

Behind the front plate 42 of the cap 4 the central outlet tube 44 projects rearwardly into the open front end of the control chamber 2. An obturator or control piston 3 is enclosed in the control chamber 29, and has a flat central disc 31 with a set of axially-projecting integrally-formed peripheral guide lugs 32 around its edge. The control piston 3 fits substantially—i.e. occupying nearly all the cross-section without being a tight fit—into the control chamber 29 so as to be freely slidable in it, between a forward position in which its central web surface 31 lies against and blocks the rear entrance to the outlet tube 44 (as seen in FIG. 2) and a rear position in which it lies against the rear wall 26 of the control chamber 2 (as seen in FIG. 4).

The described cap and control chamber may be of polypropylene, and the piston of polyethylene, but other materials may be used.

Thus, the outlet passage for liquid in the container exists from the container's interior space 11 and forwardly through the radial clearance between the control chamber 2 and the container neck 101, forward and in through the flow openings 23 to the space between the cap 4 and the control chamber 2 (and in front of the control piston 3), and finally inwardly through the rear entrance of the outlet tube 44 and out though the discharge nozzle 441.

As described in the earlier applications, the rear wall 26 of the control chamber 2 has a set of small control openings 28.

Figure 3:
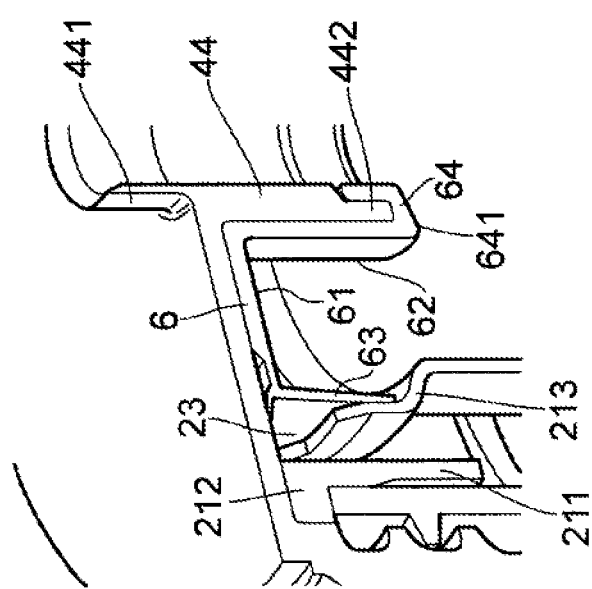
FIG. 3 is an axial cross-sectional detail of the FIG. 2 device, showing operating portions of an elastomeric insert.

Additionally, the dispensing closure comprises a one-piece integral valve and sealing insert 6, shown in one embodiment in FIGS. 2 and 3 and in a slightly variant embodiment in FIG. 4. It may be made of any suitable elastomer for the use in hand, but a polypropylene-based TPE is one suitable material. In the illustrated embodiment, the elastomeric insert comprises a flat base web 61, with a rearward central sleeve 62 extending to an in-turned seal channel portion 64. The sleeve 62 fits closely around the polypropylene outlet tube 44 of the cap. The outlet tube has a rearward edge with reduced thickness 442, and the end of the elastomeric sleeve has a channel which fits over this so that the overall thickness is maintained, with a flush inner diameter. The rearward surface 641 of the elastomer channel constitutes an elastomeric sealing surface against which the web 31 of the piston 3 seals in use.

The rearwardly-projecting sealing lip portion 63 of the elastomeric insert 6 is provided as a continuous annular formation (i.e. extending around the flow openings and also the supporting structures, for simplicity), and projects rearwardly to engage with resilient bias against the internal surface of the flared supporting regions 213 adjacent the flow openings 23.

FIG. 4 shows a variant in which the flat base web 61 of the elastomeric insert continues radially outwardly beyond the root of the sealing lip 63. This outer radial extension 615 is trapped, together with the support structure 21 of the control chamber 2, against the cap web 42 by the threading of the closure onto the container neck. This helps to keep the elastomer component 6 in position and may obviate the use of adhesives in assembly.

In use, the general dosing action is as described above and in WO2005/049477, and need not be repeated here. It will be noted that, while the valve flap 63 is differently disposed and oriented compared with the valve elements disclosed in the earlier application, its ability to prevent reverse flow is similar. However it has the additional property, by virtue of its biased resilient seal, of preventing premature dripping from the device after inversion of the container, before a dose is squeezed out. It has sufficient strength and resilience to withstand the head of liquid in the inverted container, and yields to provide the dispensing action only when the container is squeezed. Moreover, unlike the free valve elements described in the earlier application, it maintains its sealed condition in all orientations and avoids undesirable dripping or leakage in other situations too.

Additionally, the improved sealing engagement between the elastomeric surface 641 of the outlet tube and the front face of the piston web 31 gives an improved cut-off of flow at the end of each dispenser action.

Figure 5:
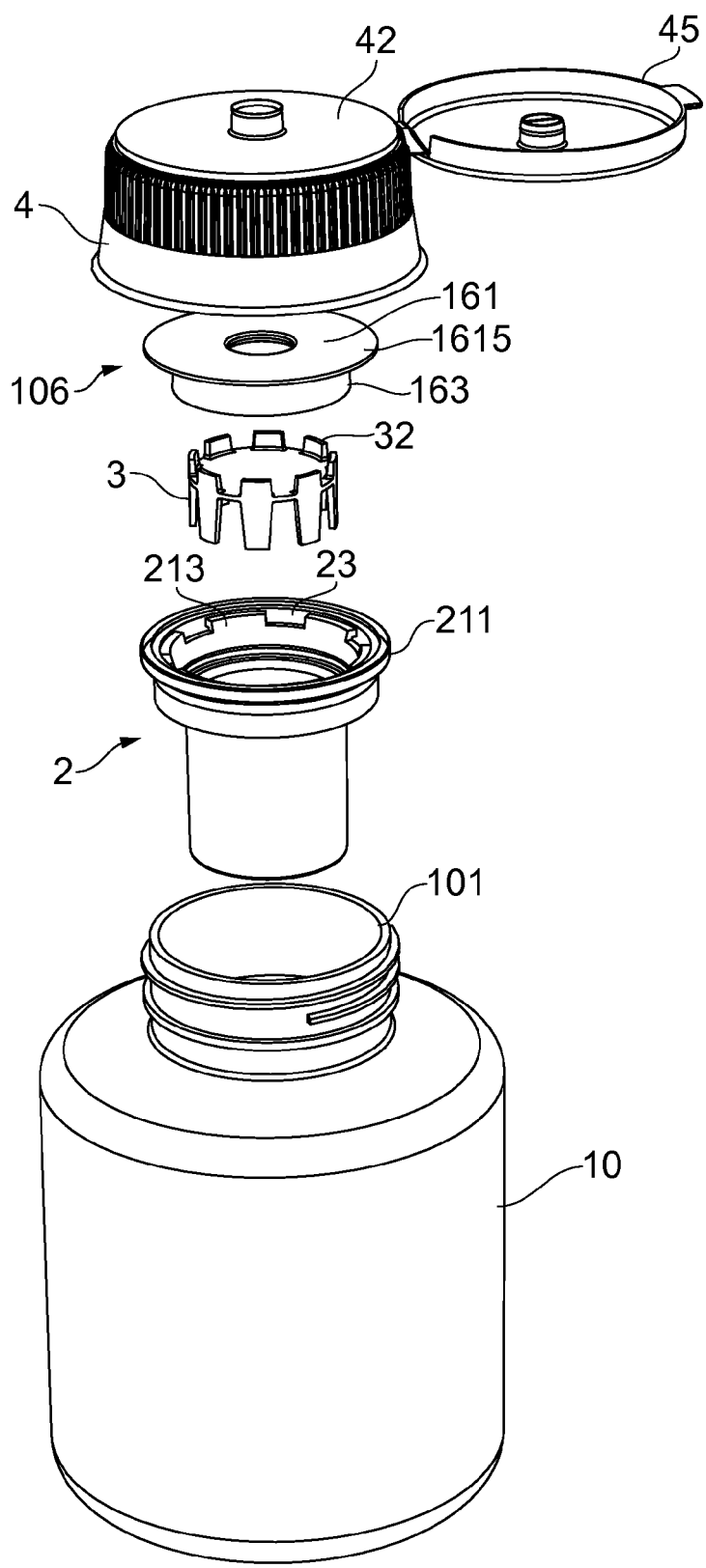
FIG. 5 is an exploded view of a further variant (third embodiment) showing a different form of the elastomeric insert.
Figure 6:
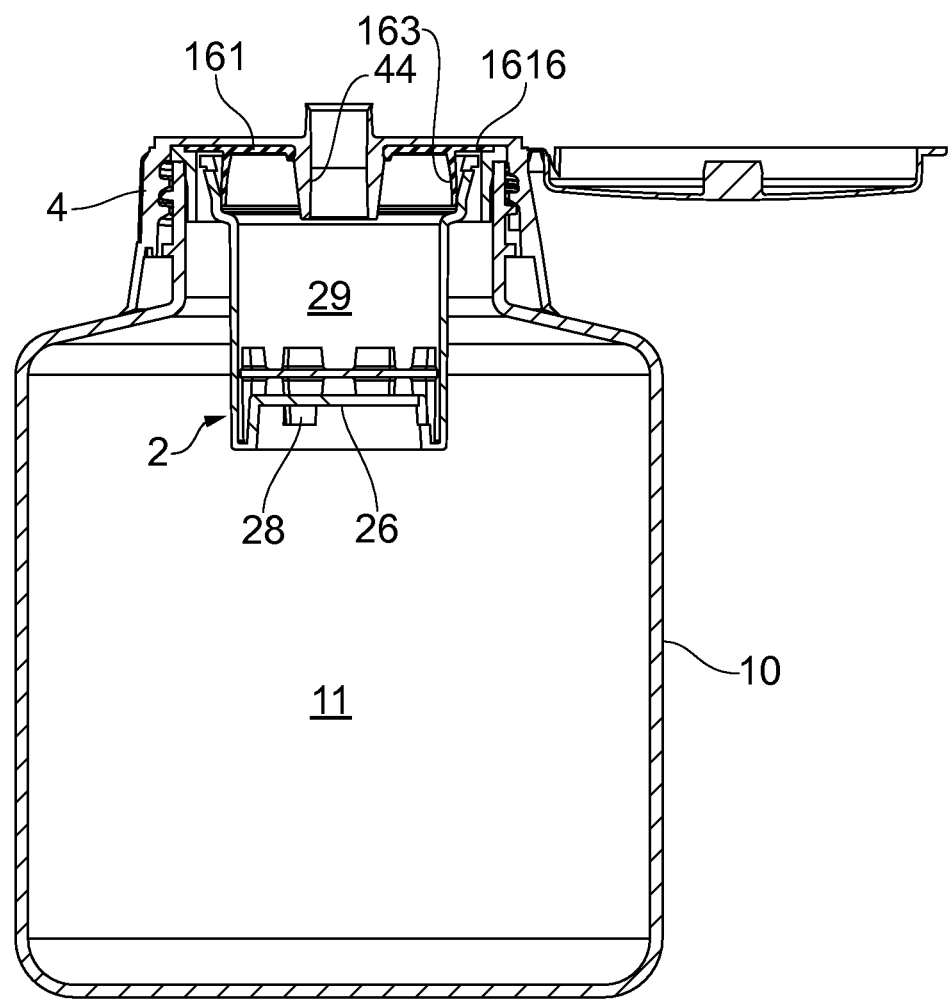
FIG. 6 is an axial section of the third embodiment assembled upright.

FIGS. 5 and 6 show a third embodiment in which the control chamber 2, control piston 3 and cover cap 4 are the same as in the first two embodiments. Here however the elastomeric valve insert 106 provides the anti-reverse and non-drip functions, but does not provide the elastomeric seat for the control piston. Thus, the elastomeric insert 106 has the front base web 161 with a simple central hole to fit around the outlet tube 44 of the front cap, extending out to the trapped outer flange 1615 as before, and projecting rearwardly with the outwardly-flaring annular sealing lip 163. As in the previous embodiments, the sealing lip 163 seals outwardly against the inwardly-directed surface of the forwardly outwardly-flaring mounting structure 213 of the control cylinder 2, which also defines the flow openings 23 (see FIG. 5). Also as in the previous embodiments the sealing lip 163 is pre-loaded or bias against the counter-surface. That is, the elastomeric insert 106 in the free as-molded form has the sealing lip 163 flaring out more widely and then seen in FIG. 6. On assembly the sealing lip or flap 163 is put forward into the rearwardly convergent (forwardly divergent) front structure of the control cylinder and deformed inwards, pre-loading it against the seat. This enables the seal to withstand a head of pressure from liquid in a container when the container is upside down, preventing or reducing dripping before the container is squeezed. The skilled person would appreciate that the thickness and a degree of preload of the elastomeric insert 106 can readily be 'tuned' to prevent dripping to the desired degree in a container of a given size, while readily allowing flow when the container is squeezed. It will also be noted that in these designs, unlike those in WO2005/049477, a moderate movement of the flap 163 away from its seat is sufficient to open up a substantially opening area for outflow, relative to the area of the flow openings 23.

Figure 7:
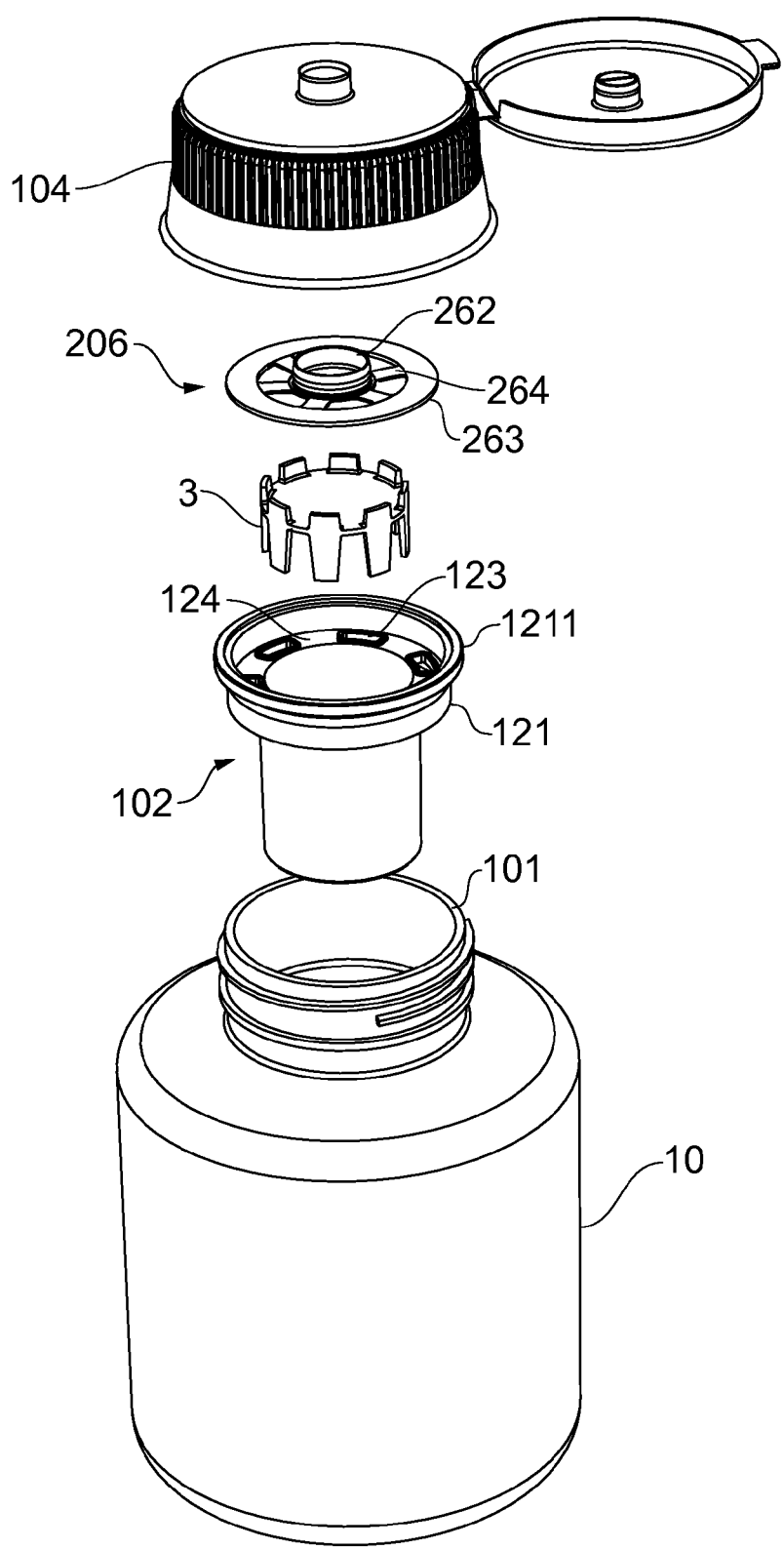
FIG. 7 is an exploded view of a fourth embodiment with an elastomeric insert having radial flexible legs and a variant construction of the control cylinder component.
Figure 8:
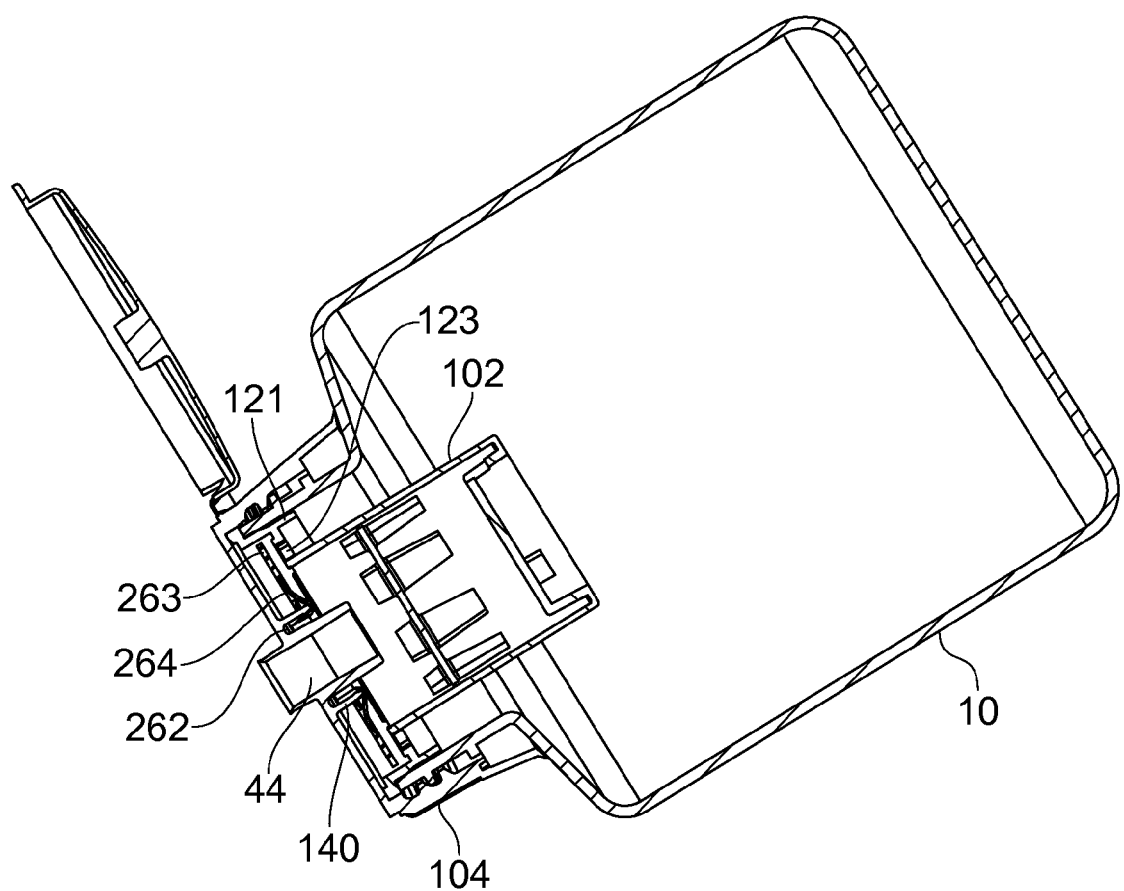
FIG. 8 is an axial section of the fourth embodiment with the container inverted for dispensing, showing the position of the elastomeric insert during dispensing.

FIGS. 7 and 8 show a fourth embodiment. Here the container 10 and control piston 3 are the same as in previous embodiments, but the control cylinder 102, front cap 104 and sealing insert 206 are slightly different. Firstly, the control cylinder defines the flow openings 123 through an axially-directed wall or face 124 diverting perpendicularly out from the cylindrical wall of the chamber 102, and meeting the outer mounting annulus 121 perpendicularly. To seal these axially-facing flow openings 123, an axially-operating valve member is needed. In this embodiment it is provided by annular valve insert 206, made from elastomer in one piece as in the previous embodiments. In this embodiment the sealing element or flap 263 is a flat annulus, connected to a central mounting sleeve 262 by a set of integral spokes or legs in the manner of a wheel. The front plate of the cover cap has a rearwardly-projecting skirt 140 concentric with and close to the outlet tube 44, defining a circular notch in to which the mounting tube 262 of the elastomeric sealing insert 206 is plugged to hold it into position.

FIG. 8 shows the container inverted for dispensing. The figure shows the sealing flap 263 of the seal insert displaced forwardly away from the flow openings 123, as by the pressure of liquid being squeezed through from the container behind, with concomitant flexing of the legs or spokes 264. When squeezing pressure is released, the elastic for storing force of the legs 264 is sufficient to return the flap 263 to seal against the flow openings 123 and reduce or prevent dripping. Again, this can be readily achieved by tuning the thickness and material of the legs, and adjusting a pre-load of bias of the valve flap which is determined by the relative axial heights of the flap 263 and mounting sleeve 262 in the free form of the valve insert.

Figure 9:
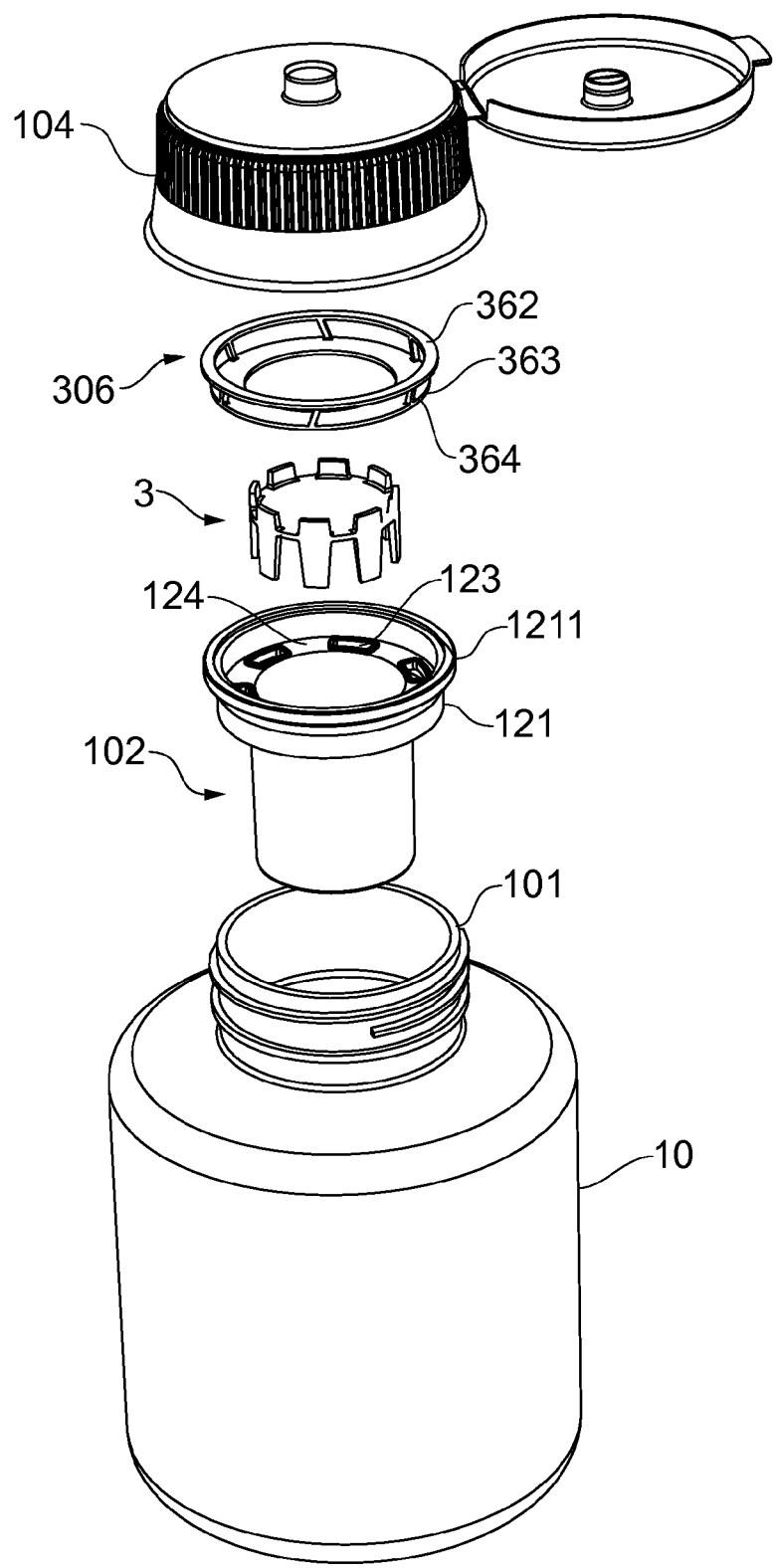
FIG. 9 is an exploded view of a fifth embodiment, with the same variant control cylinder construction as the fourth embodiment in a different form of elastomeric insert with axially-extending flexible legs.
Figure 10:
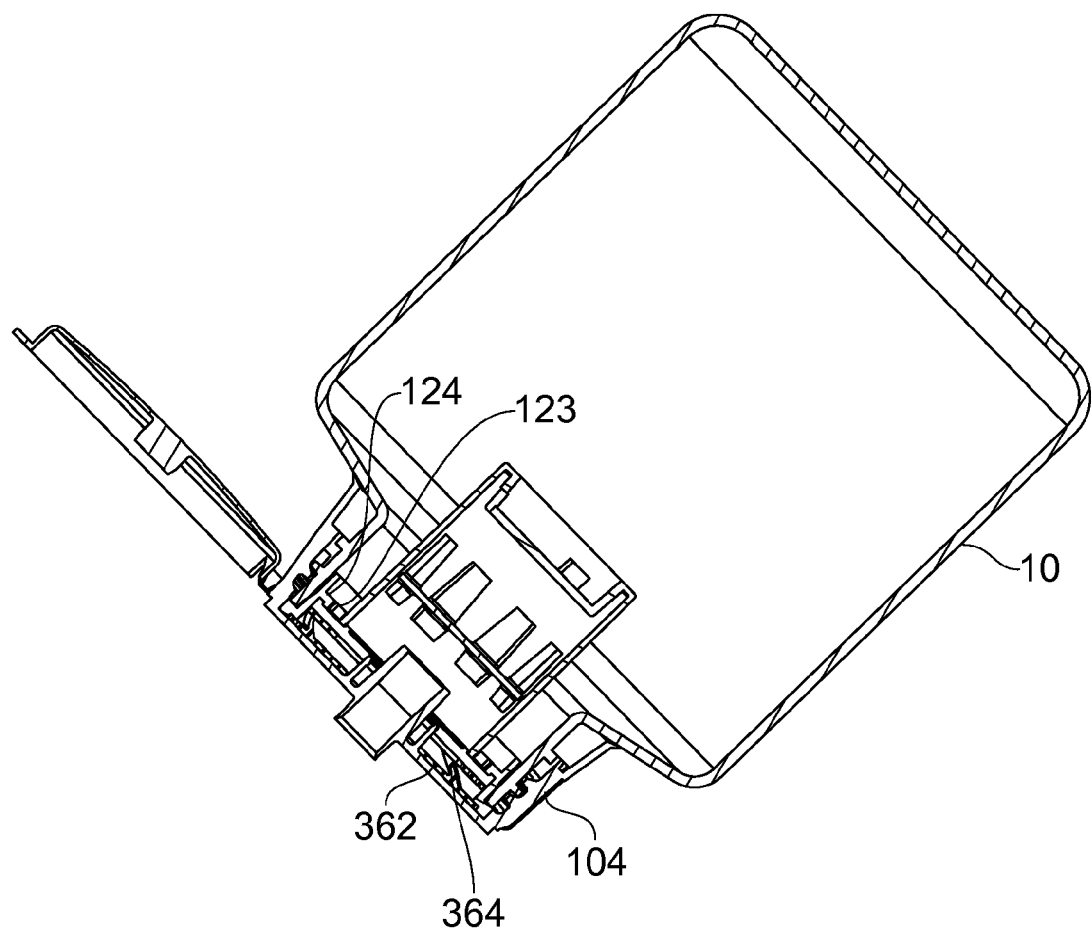
FIG. 10 is an axial section of the fifth embodiment with the container inverted for dispensing, showing the position of the elastomeric insert as during dispensing.

FIGS. 9 and 10 show a fifth embodiment. The control chamber 102 takes the same variant form as in the fourth embodiment, with axially-facing flow openings 123. Here, the elastomeric valve insert 306 has a flat annular sealing flap 363 similar in form to the sealing flap 263 in the wheel-form valve insert 206 of the previous embodiment. In this embodiment the valve insert acts against the front of the cover cap as a reaction point, as in the first three embodiments. To provide a resilient restoring action for the axially-acting flap 363, this is done by means of a mounting ring 362 which rests against the inside of the cover cap (see FIG. 10), and a set of axially-extending—but slightly sloping or oblique—support legs 364. In the free as-moulded condition of the valve insert 306, the axial height of the insert is slightly greater than the distance between the front of the flow openings 123 and the back of the cover cap in the assembled condition, so that the valve flap 363 is pre-loaded against the openings to prevent dripping with the container inverted but not squeezed. Tuning of this effect can be readily achieved by adjusting the number, thickness and form of the support legs 364. FIG. 10 shows the elastomeric insert in the deformed condition as during dispensing with the container squeezed, i.e. with the annular flap 364 pushed forward away from the flow openings 123 by the pressure of liquid from the container.

The skilled person will appreciate that there are various other methods for providing an effectively resilient valve insert to control flow openings adjacent the front of a control chamber of the type described, taking into account the position and orientation of the flow openings. The particular forms of mounting structure for the moving element of the valve shown above, formed in one piece with the valve insert, are merely exemplary.

It will be understood that, as in previous embodiments, these valves immediately respond to any reverse flow pressure to completely block the flow openings 123 so that any reverse flow must part through the control chamber.

All the embodiments herein show a control chamber with a fixed back wall, it should be understood that any of the anti-reverse valve concepts and embodiments disclosed herein may be embodied alternatively in combination with a dump valve at the rear end of the control chamber, for example a valve with a moving body such as the pull valve seen in FIGS. 1 to 6 of WO2005/049477.

As a result, we find that the illustrated dispensers enable ready dispensing of two, three, four or more successive metered doses without the container needing to be righted from the inverted position.

We prefer that the device is adapted to give a dose size of between 10 and 50 ml, but this will vary from one product to another, and of course will to some extent depend on the viscosity of the product as well as on the selection of components in the dispenser.

The aspects of the invention include the liquid dosing device itself, a closure assembly comprising such a device, a container such as a squeezable container with such a closure assembly fitted onto it, and a dispensing package comprising such a squeezable container, liquid product therein, and the liquid dosing dispenser/closure fitted to it. Further aspects are corresponding methods of dispensing liquid, especially with repeated dosing in the inverted position as described.

The skilled reader will appreciate that the invention is not necessarily limited to the features of the described embodiments and other embodiments may be made and used on the basis of the general teachings herein.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A dosing device for dispensing metered doses of liquid from a resiliently squeezable container, the dosing device comprising:
   a component having an outlet tube which defines a discharge opening, a control chamber, an obturator movable in the control chamber;
   the dosing device defining an outlet passage for liquid from the container leading past or around the control chamber to the discharge opening;
   the control chamber having one or more control openings to admit a restricted flow of liquid from the container interior into the control chamber;
   the obturator being movable in the control chamber and adapted to advance during dispensing, under the influence of liquid flowing into the control chamber through the one or more control openings, to a blocking position where it blocks the outlet passage to terminate a dose; and
   wherein the dosing device comprises an elastomeric valve constructed and arranged to prevent reverse flow in the outlet passage, the valve being adjacent a periphery of the control chamber and comprising a sealing lip resiliently biased towards a closed position against a corresponding opposed sealing region of said control chamber, said elastomeric valve including a front base web which is fitted around said outlet tube.

2. A dosing device according to claim 1 in which said valve includes a portion fixed on said component, the sealing lip projecting rearwardly from the portion.

3. A dosing device according to claim 2 in which the elastomeric valve is fabricated out of rubber or other elastomer material.

4. A dosing device according to claim 3 wherein the sealing lip is a continuous annular flap.

5. A dosing device according to claim 2 in which said portion is in the form of a layer or web which lies against a surface of the component of the dosing device.

6. A dosing device according to claim 1 in which the component of the dosing device is a cap defining the discharge opening.

7. A dosing device according to claim 6 in which the cap comprises a tubular outlet formation having the discharge opening, the formation projecting rearwardly towards the control chamber and having an annular periphery against which the obturator seats in the blocking position.

8. A dosing device according to claim 1 comprising a member defining the control chamber which includes a supporting structure constructed and arranged to mount the member in a container neck or in said component of the dosing device.

9. A dosing device according to claim 8 in which the supporting structure has circumferentially-distributed flow openings for the outlet passage.

10. A dosing device according to claim 1 comprising a dump valve at an end of the control chamber and operable to close during dispensing, for liquid to enter the control chamber only through the one or more control openings, and to open after dispensing, for liquid to escape from the control chamber back into the container.

11. A dosing device according to claim 1 in which said elastomeric valve is constructed and arranged to prevent dripping of liquid through the dosing device when the squeezable container is inverted without being squeezed.

12. A dosing device of claim 1 in combination with a said container which is resiliently squeezable.

13. A dosing device for dispensing metered doses of liquid from a container, the dosing device comprising:
   a component having an outlet tube which defines a discharge opening, a control chamber. and an obturator movable in the control chamber;
   the dosing device defining an outlet passage for liquid from the container leading past or around the control chamber to the discharge opening;
   the control chamber being defined by a component having one or more control openings to admit a restricted flow of liquid from the container interior into the control chamber;
   the obturator being movable in the control chamber and adapted to advance during dispensing, under the influence of liquid flowing into the control chamber through the one or more control openings, to a blocking position where it blocks the outlet passage to terminate a dose; and
   wherein the dosing device comprises an elastomeric valve in the outlet passage adjacent a periphery of the control chamber, said valve comprising a flap which is biased against a surface of said control chamber, said elastomeric valve including a front base web which is fitted around said outlet tube.

14. A dosing device according to claim 13 in which said flap is biased radially outwardly against an inside surface of said component.

15. A dosing device according to claim 13 in which said component defining the control chamber comprises a supporting structure constructed and arranged for mounting the control chamber in a container neck or in said component of the dosing device.

16. A dosing device according to claim 15 in which said supporting structure extends forwardly and/or radially outwardly for said mounting.

17. A dosing device of claim 13 in combination with a said container which is resiliently squeezable.

18. A dosing device for dispensing metered doses of liquid from a container, the dosing device comprising:
   a component having an outlet tube which defines a discharge opening, a control chamber positioned upstream of the discharge opening, and an obturator movable in the control chamber;
   the dosing device defining an outlet passage for liquid from the container leading past or around the control chamber to the discharge opening;
   the control chamber having one or more control openings to admit a restricted flow of liquid from the container interior into the control chamber;
   the obturator being movable in the control chamber and adapted to advance during dispensing, under the influence of liquid flowing into the control chamber through the one or more control openings, to a blocking position where it blocks the outlet passage to terminate a dose; and
   wherein the dosing device comprises an elastomeric valve for preventing the reverse flow through the outlet passage adjacent a periphery of the control chamber, the valve comprising a sealing element for resiliently urging the valve to a closed position against a corresponding opposed sealing region of said control chamber, said elastomeric valve including a front base web which is fitted around said outlet tube.

19. A dosing device of claim 18 in which the sealing element has a plurality of flexible legs.

20. A dosing device of claim 18 in which the sealing element has a mounting portion mounted on the front component of the dosing device.

21. A dosing device of claim 18 in combination with a said container which is resiliently squeezable.

22. A method of dispensing metered doses of liquid from a dosage device and container combination wherein said container is resiliently squeezable and the dosing device including a component having an outlet tube which defines a discharge opening, a control chamber, an obturator movable in the control chamber, the dosing device defining an outlet passage for liquid from the container leading past or around the control chamber to the discharge opening, the control chamber having one or more control openings to admit a restricted flow of liquid from the container interior into the control chamber, the obturator being movable in the control chamber and adapted to advance during dispensing, under the influence of liquid flowing into the control chamber through the one or more control openings, to a blocking position where it blocks the outlet passage to terminate a dose, and wherein the dosing device comprises an elastomeric valve to prevent reverse flow in the outlet passage, the valve being adjacent a periphery of the control chamber and comprising a sealing lip resiliently biased towards a closed position against a corresponding opposed sealing region of said control chamber, said elastomeric valve including a front base web which is fitted around said outlet tube, the method comprising the following steps:
    inverting the container to cause the flow of liquid through the outlet passage, with a restricted flow of liquid from the container into the control chamber through said one or more control openings; and
    advancing the obturator to said blocking position.

23. A method according to claim 22 which further includes the step of releasing an initial squeeze of the container, optionally with the container inverted, to recover the container shape and urge the obturator back so that another dose can be dispensed.

* * * * *